AUTOMATIC RESTRICTED TELEPHONE EXCHANGE

Filed Jan. 26, 1956 3 Sheets-Sheet 1

INVENTORS
NILS EMIL NILSSON
JOHN CARL HAROLD BJÖRK
GUSTAV OSCAR RODNERT
BY Frederick E. Hane
ATTORNEY May 12, 1959 N. E. NILSSON ET AL 2,886,646

AUTOMATIC RESTRICTED TELEPHONE EXCHANGE

Filed Jan. 26, 1956 3 Sheets-Sheet 2

INVENTORS
NILS EMIL NILSSON
JOHN CARL HAROLD BJÖRK
GUSTAV OSCAR RODNERT

By [signature]
ATTORNEY

May 12, 1959 N. E. NILSSON ET AL 2,886,646

AUTOMATIC RESTRICTED TELEPHONE EXCHANGE

Filed Jan. 26, 1956 3 Sheets-Sheet 3

INVENTORS
NILS EMIL NILSSON
JOHN CARL HAROLD BJÖRK
GUSTAV OSCAR RODNERT
BY [signature]
ATTORNEY United States Patent Office 2,886,646

Patented May 12, 1959

2,886,646

AUTOMATIC RESTRICTED TELEPHONE EXCHANGE

Nils Emil Nilsson and John Carl Harold Björk, Stockholm, and Gustav Oscar Rodnert, Hagersten, Sweden, assignors to Telefonaktiebolaget L M Ericsson, Stockholm, Sweden, a corporation of Sweden Application January 26, 1956, Serial No. 561,579

Claims priority, application Sweden February 17, 1955

2 Claims. (Cl. 179—18)

The present invention relates to one automatic telephone exchange. Particularly in P.B.X-exchanges there are a number of different types of traffic to which not all subscriber's lines connected to the exchange are entitled. As an example incoming and outgoing traffic over junction lines and traffic for staff locating, automatic talking machines and the like may be mentioned.

It is known to connect a particular electric potential to a signal conductor for each of such subscriber's lines which are to be cut off from or entitled to a certain type of traffic and arrange relays belonging to a register or a link circuit taking part in the setting up of a communication; these relays are actuated over the signal conductor and adjust the communication in accordance with the traffic restrictions of the subscriber's lines in question. When there are a number of different types of traffic, it is difficult to identify, by means of different potentials, the different traffic restrictions of the subscriber's lines.

The object of the present invention is to identify access or lack of access to anyone of an arbitrary number of types of traffic by means of only one electric potential which is equal for all subscriber's lines.

In telephone systems containing subscriber's lines, selectors, link circuits and registers and with markers for connection of communications over the said selectors, this is achieved in part by means of a relay-set for control of different traffic restrictions for different subscriber's lines and by means of connecting relays which are operated from the marker and an intermediate distribution frame for rigid interconnection of a signal conductor for at least certain subscriber's lines with at least one arbitrary, free connecting contact on the said connecting relays, and also by means of relay contacts in the marker, said relay contacts being closed when a call is particularly marked and connecting a particular, electric potential to said signal conductor of a subscriber's line which will be contained in a communication being set up and which is to be controlled by means of said particular marking of the call, a relay in said relay set being actuated and closing circuits for adjustment of the communication in accordance with said traffic restrictions.

The invention will be more described, more in detail with reference to the attached drawings, Figs. 1–3.

Figure 1:
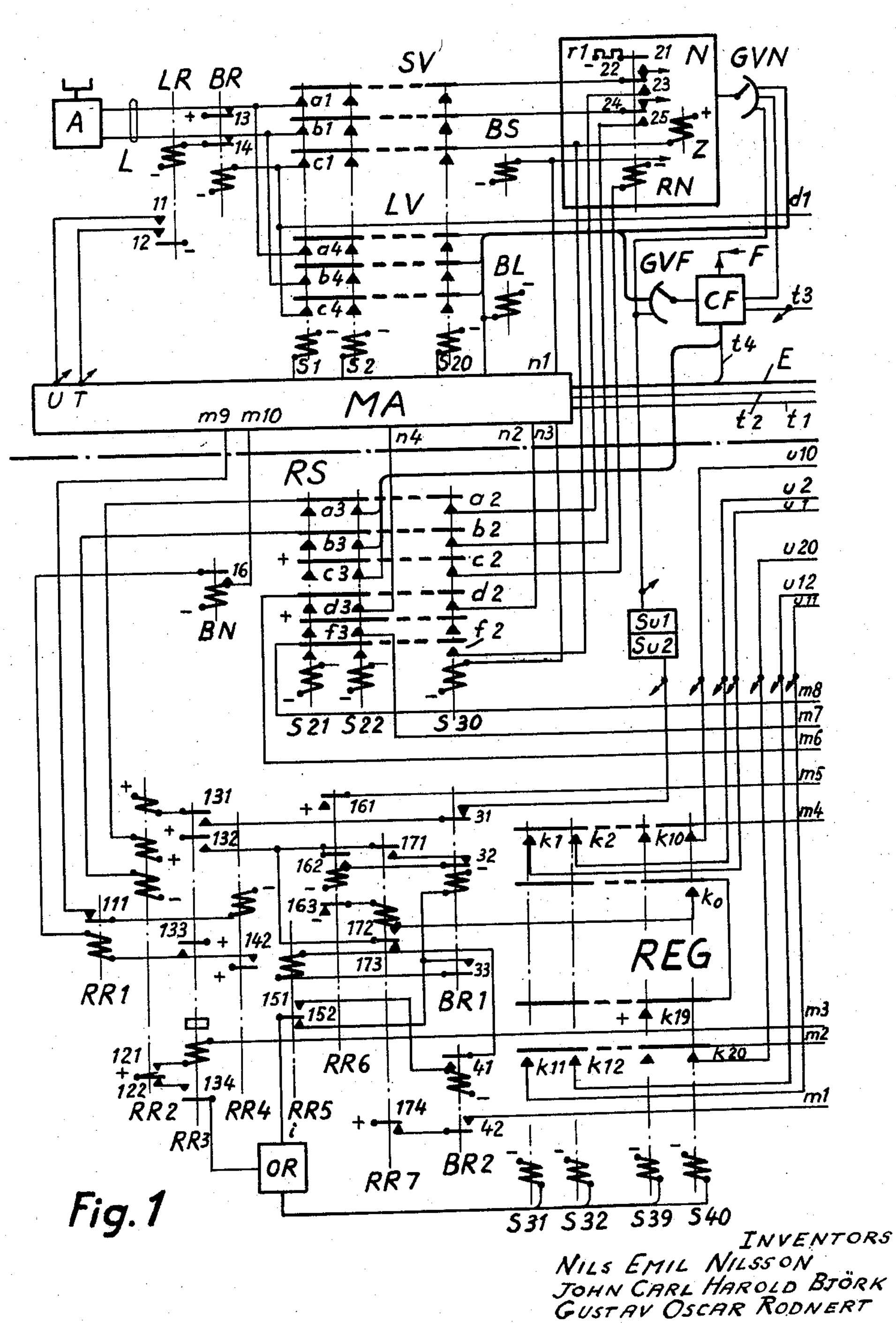
Figure 1 shows a subscriber's line L connected to a P.B.X-exchange containing line-finders SV, final selectors LV, link circuits N with group selectors GVN and registers REG with register finders RS.

According to Fig. 1 the subscriber's instrument A is connected to the line and cut off relays LR—BR and to the multiple of the line finder SV and of the final selector LV by means of the line L. Through a link circuit N and a register finder RS the subscriber's instrument can be connected to a register REG this taking place under control of a marker MA—MB. Through the group selector GVN and the final selector LV the subscriber's line L can be connected to another subscriber's line. A junction line F can be connected to the subscriber's line L either through the group selector GVF and the line selector LV or through the group selector GVN and the line selector SV. The selectors SV, LV and RS are operating bars in cross bar switches, each one of the selecting magnets S1–S20 and S21–S30 of which is common to a number of selectors. The registering mechanisms of the register REG are also operating bars in a cross bar switch with selecting magnets S31–S40. The junction line contains a line equipment designated by CF and the register contains a relay equipment OR, RR1–RR7. There are further shown two buzzers Su1—Su2. The subscriber's numbers contain two-digits.

Figure 2:
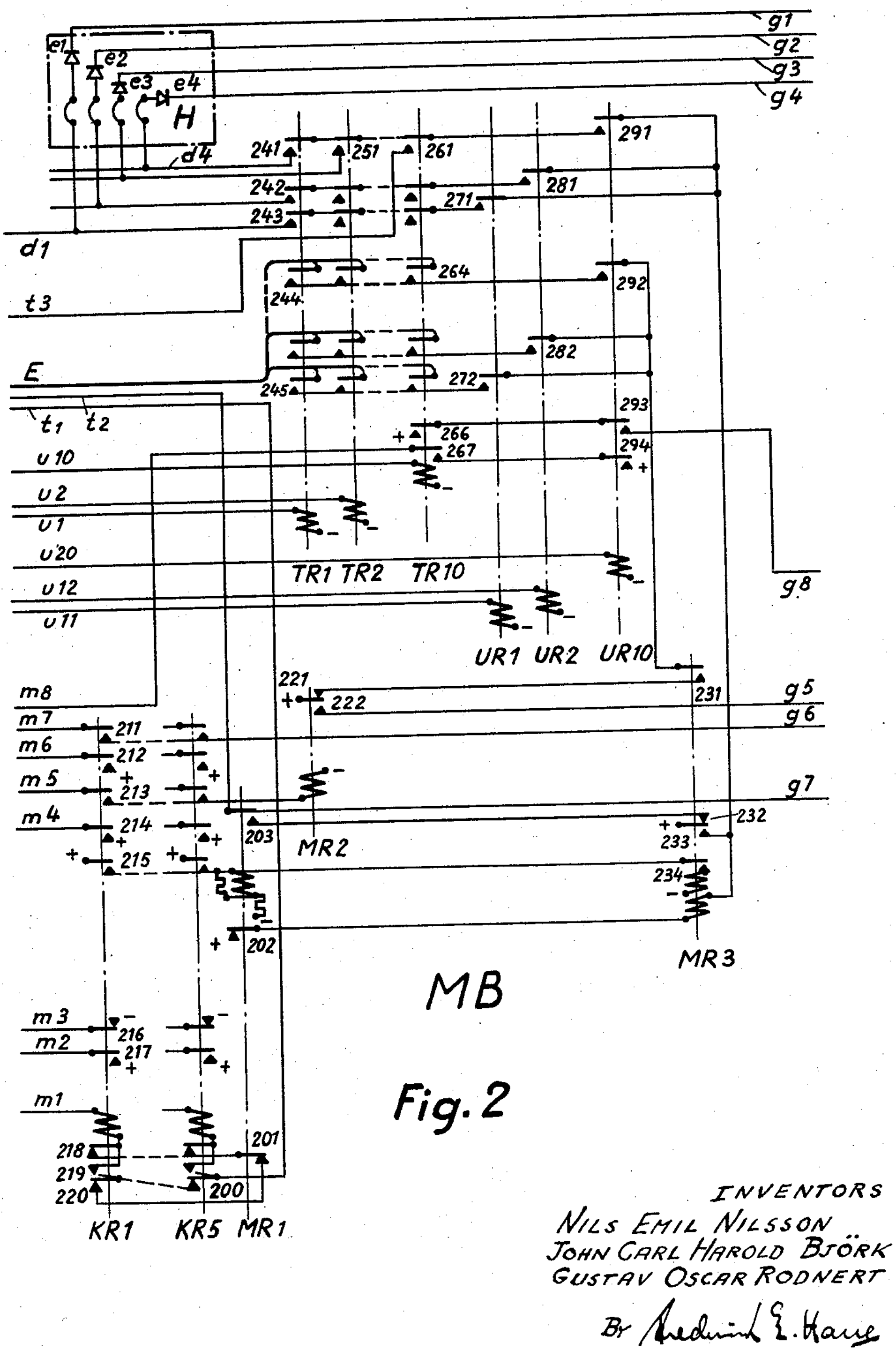
Figure 2 shows details of a marker MB the other part MA of which is unimportant for the invention and of which is only diagrammatically in Figure 1.
Figure 3:
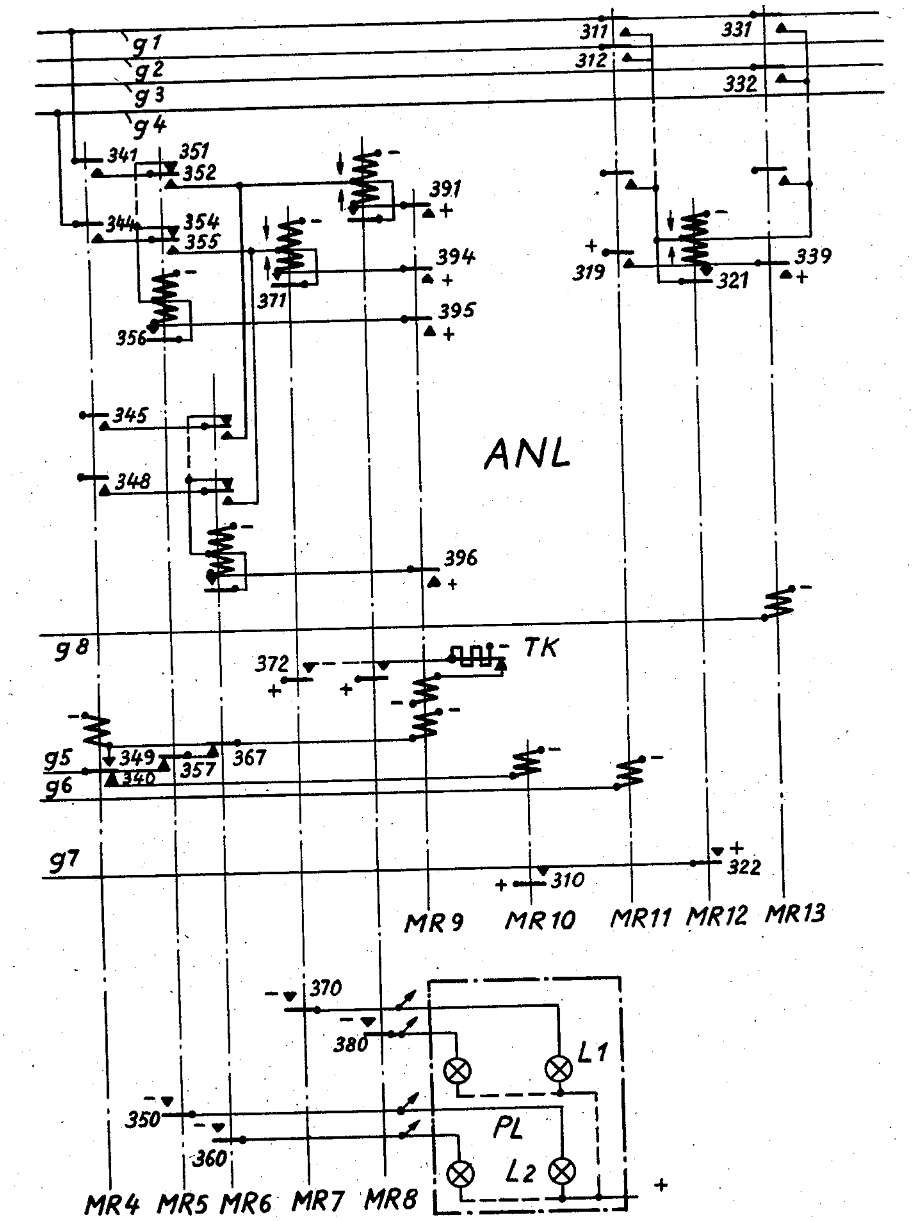
Figure 3 shows a relay set for controlling different traffic restrictions for different subscriber's lines.

In Fig. 2 there are shown an intermediate distribution frame H and a number of relays MR1–MR3, TR1–TR10, UR1–UR10 belonging to the marker MA—MB and connecting relays KR1–KR5 for connection of the registers REG to the marker. The relay set MR4–MR13 which is shown in Fig. 3 is in the following called analyser and is combined with a number of lamp fields PL for staff locating. Three different types of traffic can be controlled by the analyser ANL i.e. staff locating, incoming traffic from the junction lines F and outgoing traffic over the junction lines F.

Upon a call from the apparatus A, the line relay LR operates. The contacts 11—12 close the circuits through the wires U and T to the marker, said circuits indicating the units digit and the tens digit of the number of the subscriber's line L. The marker selects, in a known way, a free link circuit N and a free register REG. The subscriber's line L is indicated by operation of the selecting magnet S1, and the link circuit N is indicated by operation of the selecting magnet S30 with current over the wire *n*3. In the selected register REG the relay RR4 is operated with current over the wire *m*9. The contacts 141—142 close. Then the marker actuates, over the wire *n*1, the operating magnet BS for the line-finder SV belonging to the selected link circuit S and, over the wire *m*10, the operating magnet BN for the selected register. The contacts *a*1, *b*1, *c*1 and *a*2, *b*2, *c*2, *d*2, *f*2 and 16 close. The cut-off relay BR is energized through the contact *c*1 in series with an impedance Z and actuates the contacts 13—14. The line relay LR releases its armature, and the marker is released. The relay RN in the link circuit operates in a circuit through the contact *c*2. The contacts 21–25 are actuated, the link circuit N thereafter being kept busy by a circuit through the resistance *r*1 and the contact 21. In the register the relay RR1 operates in a circuit through the contacts 142 and 16, which circuit also serves for holding the operating magnet BN. The contact 111 is actuated and marks the register busy.

The impulse relay RR2 operates in the following circuit: +, the intermediate winding of RR2, the contacts a2, 23 and a1, the line L and the instrument A, the contacts b1, 25 and b2, the lower winding of RR2, to negative. The contacts 121—122 are actuated. The slow holding relay RR3 operates in a circuit through the contact 121, the wire m3 and the contact 216. The contacts 131—134 close. The subscriber at the instrument A hears a buzzer tone which is sent from the buzzer Su2 through the contacts 31 and 131 through the upper winding of the relay RR2, and dials the number for the line or the instrument to which he wants to be connected.

It is supposed that the instrument A is not allowed to be used for communications to or from the junction lines F, but that the call is an attempt to cause such a communication. The caller then dials the number 00 which is the direction number for the lines F. The impulses from the dial of the instrument A are repeated by the impulse relay RR2 to a relay set OR which, after the end of each impulse train, actuates the selecting magnet S31–S40 corresponding to the number of impulses and then sends a current impulse through the wire i. After the first digit, the selecting magnet S40, thus, operates and is connected to the wire i, the operating magnetBR1 thereafter operating with current over the contact 152. The contacts k0, k10, and 31–33 are actuated. After that + on the wire i has disappeared, the operating magnet BR1 is kept energized and operates the relay BR5 in the following circuit: +, the contacts 132, 173, the winding of the relay BR5, the contacts 33, the winding of the operating magnet BR1, to negative. The contacts 151—152 are actuated. After the end of the second impulse train the selecting magnet S40 and the operating magnet BR2 operate. The contacts k20 and 41—42 are actuated. The operating magnet BR2 is thereafter kept energized in a circuit over the contacts 132, 173 and 41.

The connecting relay KR1 operates in the following circuit: +, the contacts 174, 42, the wire m1, the winding of the relay KR1, the contacts 218, 201, 210–200, the wire t1, to contacts and a relay in the marker, which contacts point out that the marker is free and which relay when operated indicates the busy condition of the marker. The relays KR1–KR5 form a relay chain in which only one relay at a time can be actuated. The contacts 210–219 are actuated. The contact 216 cuts off the current for the holding relay RR3 which, however, is slow releasing and keeps its armature in operated position during the switching operation in the marker MA—MB described below.

The tens relay TR10 and the units relay UR10 operate in the following circuits: +, the contacts 214 and 217, respectively, the wires m4 and m2, respectively, the contacts k10 and k20, respectively, the wires u10 and u20, respectively, the winding of the relays TR10 and UR10, respectively. The contact 261–267 and 291–294 close. A circuit to the marker is closed through the contacts 212, the wire m6 and the contact d2, the marker being prepared for setting the group selector GVN belonging to the link circuit N. The contact 215 closes a circuit for the relay MR1 which is slow-operating, so that the following test has time to take place. The test relay MR3 is connected in the following circuit: +, the contact 202, the lower winding of the relay MR3, the contacts 291 and 261, the wire t3, to negative through the contacts in all free junction lines F. If there is at least one free junction line, the relay MR3 operates. The contacts 231–234 are actuated. The relay MR3 is kept energized over the contact 234 and the contact 231 closes a circuit through the contacts 221, 231, 292 and 264 and a wire in the bnndle of wires E to the relays in the marker MA, which relays indicate that the group selector GVN will connect a junction line F.

Simultaneously with the above described circuits, a circuit is closed through the contacts 294 and 267, the wire m8, the contacts f2 and c1, to the wire d1, the signal conductor d1 being indicated with plus potential for controlling the traffic restrictions of the line L.

The direction number 00 means a particular marking of the call, i.e. that it is an outgoing call over the junction lines F. This causes the following circuit to be closed: +, the contacts 266 and 293, the wire g8, the winding of the connecting relay MR13, to negative. The contacts 331–339 close. As all subscriber's lines which are shut off from said outgoing traffic are connected each one to its contact on the connecting relay MR13, the following circuit is closed: +, the wire d1, the intermediate distribution frame H, the rectifier e1, the wire g1, the contact 331, the upper winding of the relay MR12, to negative. The relay MR12 attracts its armature. The contacts 321—322 close. The contact 322 closes a circuit through the wires g7 and t2 to the relays in the marker, this causing such an alteration of the operating manner of the marker, that the group selector GVN is directed to a busy position through which the instrument A is connected to the buzzer Su1 instead of to a junction line F.

The relay MR12 contains two opposed windings counteracting windings neutralize each other in the circuit which is closed through the contact 339, unless plus potential is connected to anyone of the wires g1–g4. If the call had been made from the instrument the signal conductor d1 of which is connected to the wire g2 through the rectifier e2, the relay MR12 would not have attracted and adjusted the switching operation. The last mentioned instrument with the reference numeral 12 is, thus, entitled to outgoing traffic. If another instrument, for instance that once the signal conductor d1 of which is connected to the wire g3 and which is also blocked from outgoing traffic through the central lines, is occupied by a local communication, when the control of the call of the instrument A takes place, said conductor does not have any effect on the relay MR12, the resistances in the windings of the relay MR12 being chosen, that the potential in the connection point of the windings corresponds to the potential on a conductor d1 which is marked busy. For free lines the rectifier, for instance e3, protects against current through the cut-off relay BR.

When the holding relay RR3 in the register REG releases its armature, the current through the operating magnets BN, BR1, BR2 is cut off and the register as well as the marker are made free.

Should there be no free junction line, the test relay MR3 does not attract its armature before the relay MR1 operates. The contact 202 breaks the test and a circuit for indication of busy condition is closed through the contacts 232, 203 through the wire t2. The contact 201 guarantees the time for the reset of the marker in the cases when a succeeding call waits for connection to the marker.

It is supposed that a call from the junction line F is made to the instrument A which has the reference numeral 11. The line F initiates a call from the marker through the wire t4 and the marker selects a free register REG. The line F is pointed out by actuation of the selecting magnet S22 and the operating magnet BN is caused to operate.

The contacts a3—f2 and 16 close. The number 11 is sent from the line F, the operating magnet BR1 closing the contact k1 and the operating magnet BR2 closing the contact k11. The connecting relay KR1 operates as described above. The relays TR1 and UR1 operate. The contacts 241–245 and 271—272 close. The relay MR3 tests the called line through the following circuit: +, the contact 202, the lower winding of the relay MR3, the contacts 271 and 243, the wire d1, the winding of the cut-off relay BR, to negative. Should the line L be free, MR3 operates and the contacts 231–234 are actuated. The marker receives signals through the contact 212, the wire m6, the contact d3 and the wire n4, and also through the contacts 221, 231, 272, 245 and a wire in the bundle of wires E whereby the group selector GVF and a line selector LV are set so, that the junction line F is connected to the subscriber's line L.

At the same time the following control circuit is closed: +, the contact *f*3, the wire *m*7, the contact 211, the wire *g*6, the winding of the relay MR11, to negative. The contacts 311–319 are actuated by the fact that the relay MR11 operates, which means a particular marking that the call is sent from a junction line F. Also in this case, the plus potential is connected to the wire *d*1, this time through the contacts 233, 271 and 243 and, therefore, the relay MR12 operates. The contacts 321—322 close, and the marker receives a signal through the wires *g*7 and *t*2 that the group selector GVF is to be connected to the buzzer S*u*1 for indication of busy condition instead of to the called subscriber's line L which is not entitled to communication over the junction line F.

As a third example it will be described below how the invention is applied to staff marking. When a person is to be located, a direction digit 09 is first dialled and then the telephone number of the person to be located, for instance number 10. To make the description simpler it is supposed that the location takes places from a selected instrument or telephone exchange which is to be called by the person who is to be located, when he sees his locating signal in the staff locating field PL in Fig. 3. The instrument A in Fig. 1 is supposed to be said instrument from which the location takes place.

The call starts as described above and the instrument A is connected over the line-finder SV and the link circuit N to the register REG. In order to indicate that the call is meant for staff locating the direction number 09 is first dialled. The operating magnet BR1 actuates the contacts *k*10 and *k*0 and the operating magnet BR2 actuates the contact *k*19. The following circuit is closed: +, the contacts *k*19 and *k*0, the winding of the relay RR7, the contact 163, to negative. The relay RR7 attracts its armature and the contacts 171–174 are actuated. The contact 174 prevents the connection of the register to the marker and the contact 173 breaks the holding circuits for the operating magnets BR1 and BR2 which magnets release their armatures. The relay RR7 is kept energized with current through the contacts 132 and 172. The relay RR6 operates in the following circuit: +, the contacts 132, 171 and 32, the winding of the relay RR6, to negative. The contacts 161—163 are actuated. The relay RR7 releases its armature and the relay RR6 is kept energized in a circuit through the contact 162. The caller hears again buzzer tones from the buzzer S*u*2 and dials the telephone number of the person who is to be located, for instance number 10. The contacts *k*1 and *k*20 close. The register REG is connected to the marker MA—MB. The tens relay TR1 and the units relay UR10 operate. The contacts 241–245 and 291–292 close. The test relay MR3 attracts its armature, it being supposed that the person who is to be located cannot be reached over the telephone and that his telephone is free. The contacts 231–234 are actuated and the plus potential is connected to the wire *d*4 over the contacts 233, 291 and 241.

At the same time the relay MR2 has attracted its armature in a circuit through the contact 161, the wire *m*5 and the contact 213. The contacts 221—222 are actuated. The contact 221 cuts off the connecting signal to MA so that no switching operation starts over the selectors GVN and LV. The contact 222 closes a circuit over the wire *g*5 and the contacts 357 and 367 for the relays MR4 and MR9. The relay MR4 connects the signal conductor *d*1—*d*4 for all subscriber's lines belonging to persons who can be located by means of the staff locater, to the group relays MR5—MR6. The relay MR9 closes the holding- and test circuit for the combination relays MR5–MR8 of the staff locater. All of the relays MR5–MR8 have, as described above concerning the relay MR12, two windings opposing each other, which windings neturalize each other in the local circuit which is closed through the contacts 391 and 396, respectively. The relay MR5 which is contained in the group to which the subscriber's line 10 belongs, attracts its armature in the following circuit: +, the contacts 233, 291 and 241, the intermediate distribution frame H, the rectifier *e*4, the wire *g*4, the contacts 344 and 354, the upper winding of the relay MR5, to negative. The contacts 350–357 are actuated, the contact 356 short circuiting the lower winding of the relay and closing a new circuit for actuating and keeping the relay energized over the contacts 395 and 356. The contact 357 cuts off the make-circuit for the relays MR4 and MR9 which, however, are kept energized in a circuit through the contact 349.

The contacts 354—355 change the make-circuit of the relay MR5 from said relay to the relay MR7 which operates. The contacts 370—372 close. The lamps L1 and L2 in the lamp field PL are caused to light up. The lamp combination L1—L2 is, thus, allotted the person, who has the telephone number 10, the wire *d*4 being connected in the intermediate distribution frame H to the contact 344 on the relay MR4.

When the relay RR3 in the register REG releases, the register as well as the marker are made free. The relay RN in the link circuit N releases, the caller thereafter only having to make the link circuit N free by replacing his handset and waiting for an answering call from the person who is to be located.

The relay set MR4–MR9 for the staff locater will be marked occupied during a certain time, the relay MR9 and the actuated combination relays MR5 and MR7 being kept energized by means of a circuit over the contact 372, the thermocontact TK and the upper winding of the relay MR9. The thermocontact TK determines the time for the staff locating and cuts off the holding circuit at the end of the time.

When the marker has been released, the connecting relay MR4 releases and the contact 340 closes. Should there be a new call to the staff locater during a locating period, the relay MR10 operates. The contact 310 closes a circuit through the wires *g*7 and *t*2, the marker being caused to connect the group selector GVN to the buzzer S*u*1, the caller hearing a busy signal.

We claim:

1. An automatic restricted service telephone exchange comprising, in combination, selectors, links, registers, communication circuits and marking means for connecting the communication circuits through said selectors and links, subscriber's lines subject to different service classes connectable by said marking means to said communication circuits, a signalling conductor for each of said lines to control said service classes, a group of control conductors each respresenting a combination of said service classes, distributing means for connecting the signalling circuit of one of the subscriber's lines with the control conductor representative of the combination of service classes pertaining to the respective subscriber's line, a set of relays common to all said subscriber's lines, said set including a connecting relay for each of said service classes and at least one marking relay, said marking means connecting the respective connecting relay in an energizing circuit when a communication circuit for the service class associated with the said connecting relay is to be established, switch contacts actauted by the respective connecting relay for connecting all the control conductors representative of the respective service class to said marking relay, and relay means in the marking means for connecting a source of current to the signalling conductor of the subscriber's line in the communication circuit to be established, said marking relay actuating the marking means for connecting the communication circuit pertaining to the subscriber's line having the respective service class.

2. A telephone exchange according to claim 1 and further comprising rectifying means included in each of said control conductors, a first group of marking relays for one of said service classes in said set of relays, each relay of said first group being connectable in an energizing circuit with such control conductors as are connected by the connecting relay of the respective class, a corresponding number of switch contacts associated with each of said marking relays and a second group of marking relays connected by said switch contacts to each of said control conductors, the actuation of one of said marking relays in the first group and the actuation of one of said marking relays in the second group marking the subscriber's line to be connected.

References Cited in the file of this patent

UNITED STATES PATENTS

| | | |
|---|---|---|
| 1,492,995 | Lubberger | May 6, 1924 |
| 1,960,037 | Williams et al. | May 22, 1934 |
| 2,005,595 | Roome et al. | June 18, 1935 |
| 2,504,959 | Borel et al. | Apr. 25, 1950 |
| 2,592,784 | Bakker | Apr. 15, 1952 |